(12) United States Patent
Rubens

(10) Patent No.: US 11,543,738 B2
(45) Date of Patent: Jan. 3, 2023

(54) CAMERA STABILIZATION SYSTEM

(71) Applicant: 4MOVIE BVBA, Tongeren (BE)

(72) Inventor: Jan Rubens, Tongeren (BE)

(73) Assignee: 4MOVIE BVBA, Tongeren (BE)

( * ) Notice: Subject to any disclaimer, the term of this patent is extended or adjusted under 35 U.S.C. 154(b) by 0 days.

(21) Appl. No.: 17/379,434

(22) Filed: Jul. 19, 2021

(65) Prior Publication Data

US 2022/0107552 A1 Apr. 7, 2022

(30) Foreign Application Priority Data

Oct. 1, 2020 (BE) .................................. 2020/5679

(51) Int. Cl.
| | | |
|---|---|---|
| *G03B 17/56* | (2021.01) | |
| *F16M 13/04* | (2006.01) | |
| *F16M 11/10* | (2006.01) | |

(52) U.S. Cl.
CPC ......... *G03B 17/561* (2013.01); *F16M 11/105* (2013.01); *F16M 13/04* (2013.01)

(58) Field of Classification Search
CPC ...... G03B 17/561; F16M 13/00; F16M 13/04; F16M 11/06; F16M 11/08; F16M 11/10; F16M 11/105; F16M 11/12; F16M 11/18
See application file for complete search history.

(56) References Cited

U.S. PATENT DOCUMENTS

| | | | |
|---|---|---|---|
| 5,617,762 A | 4/1997 | Kirsch | |
| 6,027,085 A | 2/2000 | Ruther | |
| 10,578,953 B1 * | 3/2020 | Hallett | ............... F16M 11/2092 |
| 11,073,747 B1 * | 7/2021 | Watts | ................... G03B 17/561 |
| 2015/0153585 A1 * | 6/2015 | Smith | .................. G02B 27/646 |
| | | | 396/55 |

FOREIGN PATENT DOCUMENTS

| | | | | |
|---|---|---|---|---|
| CN | 201513678 U | 6/2010 | | |
| CN | 107110417 A | * 8/2017 | ........... | F16M 11/045 |
| DE | 102014018550 A1 | 6/2016 | | |
| EP | 0966154 A | 12/1992 | | |
| EP | 1380793 A2 | 1/2004 | | |
| EP | 1380793 A3 | 4/2006 | | |
| EP | 1746333 A1 | 1/2007 | | |
| EP | 3627031 A1 | 3/2020 | | |
| FR | 2538878 A1 | 7/1984 | | |
| GB | 2491480 A | 12/2012 | | |

* cited by examiner

*Primary Examiner* — Christopher E Mahoney
(74) *Attorney, Agent, or Firm* — Dinsmore & Shohl, LLP

(57) ABSTRACT

Camera stabilization systems are provided, and more particularly, an improved lightweight hand-held or vehicle-mounted camera stabilization system is provided, for use in photographic or video-related applications. A stabilization of the alignment is critical in particular on moving camera supports, such as vehicles, airborne objects, and camera cranes, in order to achieve the best possible results in film or video recordings.

20 Claims, 5 Drawing Sheets

CAMERA STABILIZATION SYSTEM

CROSS-REFERENCES TO RELATED APPLICATIONS

This application claims the benefit of priority under 35 U.S.C. § 119 to Belgian Patent Application No. 2020/5679, filed Oct. 1, 2020, which is hereby incorporated by reference in its entirety.

TECHNICAL FIELD

This disclosure relates generally to camera stabilization systems and more particularly to an improved lightweight hand-held or vehicle-mounted camera stabilization system, for use in photographic or video-related applications. A stabilization of the alignment is critical in particular on moving camera supports, such as vehicles, airborne objects, and camera cranes, in order to achieve the best possible results in film or video recordings.

BACKGROUND

Advances in optical, video, and traditional photographic technologies have made high quality portable photographic equipment available to a growing number of film enthusiasts. As a result, motion pictures of increased quality and complexity are produced by professionals and enthusiasts alike. However, this quality evolution has exacerbated the well-known "jitter" problem when shooting with a handheld camera. Even when the operator tries to hold the camera steady during panning or translation, the transmission of uncontrolled operator motion to the camera results in unwanted camera jitter, detracting from the aesthetics of the resulting video product. Shooting from a moving, floating or airborne vehicle is even more difficult because of the uncontrolled vehicle motion. Turning or carrying a camera in a smooth glide requires a great deal of skill and experience, particularly in action scenes where the camera operator is walking, running, or riding in a vehicle to follow the subject of the film. In action situations, the already difficult task of holding a camera steady despite motions resulting from the operator's breathing, heart beat, and involuntary muscle movements, may be aggravated by uncontrolled environmental conditions. The resulting footage is often erratic, jerky, and visually unappealing. Motion disturbances, particularly angular disturbances transmitted from the operator to the camera, are the primary problem.

A popular mechanical (non-electronic) camera stabilization device is the Steadicam®. The Steadicam® rig uses a large counterweight mounted a significant distance from the camera that shifts the rig's center of mass to a handle that the operator then manipulates. Although popular, the Steadicam® device is heavy, large and awkward, puts a strain on the operator, requires a long set up time, requires a cumbersome operator harness, and limits the range of camera movement. The operational smoothness of a Steadicam® depends mainly on the operator because the operator must manually control the camera's orientation via a handle and must carefully keep the camera poised and balanced within the narrow range of system capabilities. This makes operation of and smooth slewing of the camera a function of operator strength and skill.

Besides mechanical stabilization systems as the Steadycam® the camera stabilization art is replete with gyro sensor stabilized camera system proposals that rely on an integral three-axis gyro sensor to measure platform tilt, pan and roll from a single location coupled to the camera platform. Disadvantageously, the gyro sensor configuration used universally in the art collocates the three rotation sensors in a single package, which introduces several problems. Each sensor's sensitivity to rotation about a stationary axis varies according to the pivot rotation position about another axis. For example, the sensitivity of a yaw rate sensor mounted directly on the camera platform decreases from maximum to null as platform pitch angle increases from zero to 90 degrees. Also, at large pitch angles, the pitched yaw sensor introduces orthogonal rotation components into the signal used to control yaw motion. Practitioners in the art are keenly aware of this problem and have proposed various "band-aids" such as adding relative position encoders and gravity-level sensors and adding complex sine-cosine coordinate transformations to maintain constant control loop gain in the stabilizer control circuitry. As another example of these disadvantages, the usual closed-loop servo control systems are easily destabilized by mechanical resonances arising from mechanical decoupling and separation of the sensors from their respective actuators. Until now, practitioners generally have attempted to ease this problem by using mechanically stiff (heavy) gimbaled frames that are not suitable for lightweight, handheld stabilizers, which require lightweight frames that are unavoidably flexible.

Commercial examples include a Dual Sensor Gimbal turret and camera by Gyron Systems International, Ltd., which measures 30×35×28 inches, for mounting outside of a helicopter. A two-channel fiber optic gyro package is used to stabilize the pan and tilt axes while the roll axis is stabilized by a quartz angular rate sensor. The outer pan and tilt gimbals are driven by direct-drive torque motors without gearing. The inner pan and tilt gimbals are driven by voice-coil actuators without gearing, to eliminate gear wear problems. The roll axis is driven by a torque motor driving through a ladder-chain. The angular rate sensors are grouped together on a common platform, as is universally done in the art, leading to the disadvantageous angular interaction problem described above. Gyron literature neither considers nor suggests application of their aeronautical techniques to mechanically-stabilized handheld stabilizer systems using lightweight, flexible frames.

Another example of a camera stabilization system is disclosed in EP3627031. In this system a lens module 210 is disclosed in FIG. 4, which sleeves over the lens and which is circular-ring-shaped, including a circular-ring-shaped disc-type electrical motor to enable rotational movement of the lens. One of the downsides of the system disclosed in this reference, is the lack in flexibility. For example the camera lens module is dimensionally fixed and requires different modules depending on the lenses being used. The ring motor being integrated, inevitably restricts the capacity of the system in for example weight of the camera that can be controlled.

As may be readily appreciated from these examples, the individual consumer selecting a camera platform stabilization system is limited to a variety of heavy, stiff commercial systems of moderate to high cost that require several heavy flywheel gyros each requiring a heavy power-pack or battery for spin-up, or to systems with functional restrictions.

There is accordingly a clearly felt need in the art for a relatively inexpensive handheld camera stabilization system that is lightweight and flexible in the dimensions (size and weight) of cameras (maneuverable), stable over a wide range of angular positions and jitter frequencies (to DC). Such a stabilization system should also be suitable for smoothly simulating any desired camera motion responsive to a simple motion control signal transferred to the stabilizer controller. These unresolved problems and deficiencies are clearly felt in the art and are solved by embodiments disclosed herein in the manner described below.

SUMMARY

In a first aspect the present disclosure provides a camera cage including camera stabilization features, which in its base configuration consists of a camera cage comprising a ring bearing and a motor whose motor shaft is coaxial with the central axis of the ring bearing, the camera cage being provided with means for connecting the motor and the ring bearing about the same central axis at a mutually variable distance, wherein the ring bearing has an inner diameter that may surround a lens, and wherein the camera cage is provided with a camera mount such that the optical axis of the camera is coaxial with the central axis of the ring bearing.

The ring bearing and the motor being connectable in the cage at mutually variable distances, they arguably shape the opposite sides of the cage, wherein the motor will typically form part of the base of the cage, opposite which the ring bearing is being positioned. Dependent on the size of the camera or the sizes of the lens, additional ring bearings may be coaxially positioned opposite the base.

In one embodiment the motor is integrated in the base of base frame of the camera cage. Being an objective of the present disclosure to provide a camera cage that can be adjusted to the specifications of the camera to be suspended therein, in one embodiment the motor is suspended by means of a holder in the base frame. In particular embodiment this holder will be tailored to the motor that needs to be suspended in the cage. In another embodiment the holder, hereinafter also referred to as the motor holder, is configured to provide a suspension of the motor in the base frame, such that the motor shaft is coaxially with the central axis of the ring bearing(s).

Being one of the objectives of the present disclosure to provide a camera adjustable camera cage, in one embodiment the motor will accessible and replaceable in the base frame. In one embodiment the motor will be accessible through the motor holder, such as by means of an access panel or in that the motor holder is configured to be removable from the base frame. In said latter embodiment the motor holder may even be exchangeable with a motor holder tailored to the motor that needs to be suspended in the cage. In a preferred embodiment, the motor is suspended centrally by means of a motor holder, as herein provided, in the base frame. In another preferred embodiment the motor as used herein is a roll stabilization motor. As such, and in said embodiment, the camera cage can be used as a camera stabilization apparatus, and may further include a motor control board, hereinafter also referred to as a motor controller, with one or more gyroscopic sensors. The motor and motor controller will allow rotation and stabilize elements around the central axis of the ring bearing. In a particular embodiment the motor controller is replaceable. In one embodiment the motor and the motor controller are present within the motor holder. In another embodiment the motor controller is mounted on the outside of the base frame, more in particular on the outside of the motor holder. In an embodiment the motor controller is equipped with a power supply connection, in particular with a power supply connection for a battery pack, more in particular for a battery pack that can be connected to the controller, even more in particular for a battery pack that can be replaceable connected to the controller.

In some embodiments, the stabilization apparatus may utilize one or more slip-ring connections for power and/or signal leads, thereby allowing a full 360 degrees of rotation about the roll axis of the stabilization apparatus without twisting wiring of the power and/or signal leads. Wiring, where possible, may be at least partially run inside the camera cage, thus reducing the risk of wires being snagged and/or broken when performing a full 360-degree roll motion around the central axis of the ring bearing.

In one embodiment, the camera cage according to this disclosure includes a rotatable base. Said rotatable base being connected with the motor shaft and equally being provided with means for connecting the rotatable base and the ring bearing at a mutually variable distance. Through said means for connecting the rotatable base and the ring bearing at a mutually variable distance, the rotational movement of the motor is transferred to the ring bearing. In a particular embodiment the rotatable base is replaceable and tailored to the motor and/or the camera to be used within the cage. As an alternative, or complementary to the one or more slip-ring connections for power and/or signal leads, the rotatable base may comprise one or more connections and/or pass-throughs for power/signal wiring enabling the connection of the camera to external elements.

Being an objective of the present disclosure to provide a camera cage enabling a roll movement of the camera around its optical axis, coaxially with the central axis of the ring bearing, the camera mount must be present within the cage to enable said movement. Thereto, in one embodiment the camera mount will be part of or is connected with the rotatable base. When connected, the camera mount could be directly connected with the rotatable base, indirectly through the means for connecting the rotatable base and the ring bearing at a mutually variable distance, or combinations thereof. In a particular embodiment the camera mount is suspended on the means for connecting the rotatable base and the ring bearing at a mutually variable distance.

Per reference to the drawings, in one embodiment the means for connecting the ring bearing at a variably spaced distance from the motor and the rotatable base consists of a combination of clamps and rods. A first set of clamps and rods connect the base frame with the outer ring of the ring bearing and a second set of clamps and rods connect the rotatable base with the inner ring of the ring bearing. In another embodiment the first set of clamps and rods or connected to the outer perimeter of the base frame and the outer ring of the ring bearing. In another embodiment the means for connecting the base frame at a variable distance with the ring bearing comprise spacers configured to adjust the orthogonal cross-sectional surface of the cage in a plane parallel with the circular cross-section of the ring bearing. It is one of the characteristics of the camera cage according to this disclosure that the outer perimeter of said orthogonal cross-sectional surface, should be able to embrace the camera housing of the camera, else a full 360-degree roll motion of the camera around the central axis of the ring bearing will not be possible. Having optional spacers as part of the means to connect the base frame at a variable distance with the ring bearing, the camera cage can easily be adjusted to the camera that needs to be suspended in the cage.

In one embodiment the base frame of the camera cage is circular; in particular with the same outer diameter as the ring bearing. Such circular base frame can equally function as handle(s) in holding the cage. Additional elements, like further handles, microphones, oculars, tripod mounting plates, and the like can be connected to the base frame, the ring bearing and/or to the first set of clamps and rods connecting the base frame with the outer ring of the ring bearing. This again adds to the flexibility of altering the camera cage depending on the needs of the operator and/or of the camera that needs to be suspended in the cage.

In one embodiment the means to connect the base frame and the ring bearing at a mutually variable distance, comprise at least two opposing and parallel running rods, in another embodiment two pairs of opposing and parallel running rods. In one embodiment the means to connect the rotatable base with the ring bearing comprise at least one rod, in particular two rods, even more in particular two pairs of opposing and parallel running rods. Per reference to the drawings, two rods of opposing and parallel running rods is meant to include a pair of rods, the first rod connecting the base frame with the outer ring of the ring bearing and the second rod connecting the rotatable base with the inner ring of the ring bearing.

In one embodiment the camera cage, and in particular the ring bearing will comprise markers or reference points to allow centering of the camera's optical axis with the central axis of the ring bearing.

The disclosure can further be summarized by the following numbered embodiments.

A camera cage comprising a ring bearing and a motor whose motor axis is coaxial with the central axis of the ring bearing, the camera cage comprising means for keeping the motor and the ring bearing about a same central axis, means configured to adjust the distance between the motor and the ring bearing, wherein the ring bearing has an inner diameter which may include a lens, and wherein the camera cage includes a camera mount such that the optical axis of the camera is coaxial with the central axis of the ring bearing.

The means configured to adjust the distance between the motor and the ring bearing, are herein also referred to as the means for connecting the motor and the ring bearing about the same central axis at a mutually variable distance. The ease of adjusting the distance between the motor and the ring bearing ads to one of the main benefits of this disclosure, in providing a camera cage than can be adjusted in a fail proof way to different camera set-ups (camera housing and lenses).

The camera cage according to embodiment 1, wherein the motor is suspended centrally in a base frame of the cage by means of a motor holder.

As mentioned herein, the presence of a motor holder for the motor allows proper placement, ease of replacement, adjustment to the needs, etc.

The camera cage according to any one of the embodiments herein provided, wherein the rotating portion of the motor on the inside of the cage is provided with a rotatable base which also includes means for being connected to the ring bearing wherein said means are configured to adjust the distance between the rotatable base and the ring bearing The means configured to adjust the distance between the rotatable base and the ring bearing, are herein also referred to as the means for connecting the rotatable base and the ring bearing at a mutually variable distance. They accordingly contribute to the ease of adjusting the distance between the motor and the ring bearing ads to one of the main benefits of this disclosure, in providing a camera cage than can be adjusted in a fail proof way to different camera set-ups (camera housing and lenses).

In some embodiments of the camera cage, the camera is mounted directly to the rotatable base and/or indirectly by the means for connecting the rotatable base to the ring bearing at a mutually variable distance.

In some embodiments of the camera cage, the rotatable base is provided with connections and/or pass-throughs, such as for power/signal wiring enabling the connection of the camera to external elements.

In some embodiments of the camera cage, the means for connecting the ring bearing at a variable distance from the motor and the rotatable base comprises combinations of clamps and rods.

In some embodiments of the camera cage, the camera cage has an outer perimeter that includes the camera housing of the camera.

In some embodiments of the camera cage, the base frame is circular.

In some embodiments of the camera cage, the outer diameter of the circular base frame and of the ring bearing are equal.

In some embodiments of the camera cage, the base frame and the ring bearing are connectable by at least two opposed rods at a mutually variable distance, i.e. the rods are configured to enable adjustability of the distance between the base frame and the ring bearing. In a particular embodiment these two rods constitute a pair wherein a first rod of said pair of rods is connected to the outer ring of the ring bearing, and wherein a second rod of said pair of rods is connected to the inner ring of the ring bearing.

It follows from the foregoing that in one embodiment the rotatable base is connected to the inner ring of the ring bearing by the means for being connected to the ring bearing at a mutually variable distance. In a further embodiment the base frame is connected to the outer ring of the ring bearing by the means for being connected to the ring bearing at a mutually variable distance. In a preferred embodiment the rotatable base is connected to the inner ring of the ring bearing by the means for connecting the rotatable base to the ring bearing at a mutually variable distance, and the base frame is connected to the outer ring of the ring bearing by the means for connecting the base frame to the ring bearing at a mutually variable distance.

In some embodiments of the camera cage, the motor is interchangeable.

In some embodiments of the camera cage, the camera cage further comprises a motor controller, preferably removable.

In some embodiments of the camera cage, the motor controller is suspended from the outside of the base frame, and is preferably provided with a power connection.

In some embodiments of the camera cage, the motor controller is interchangeable.

In some embodiments of the camera cage, the power supply comprises a battery.

In some embodiments of the camera cage, the ring bearing includes one or more camera center points.

BRIEF DESCRIPTION OF THE DRAWINGS

With specific reference to the figures, it is emphasized that the details shown are by way of example only and for the illustrative discussion of the various embodiments of the present disclosure only. They are presented for the purpose of providing what is seen as the most useful and straightforward description of the principles and conceptual aspects of the disclosure. In this regard, no attempt is made to show more structural details of the invention than is necessary for a basic understanding of the disclosure. The description in conjunction with the figures clarifies to those skilled in the art how the various forms of the disclosure can be carried out in practice.

DETAILED DESCRIPTION

An example of the camera cage 1 and camera stabilization system is provided in the figures of the present application, as mentioned above, these examples are for the illustrative purposes and have no intention of limiting this disclosure to particular details or combination of features. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Figure 1:
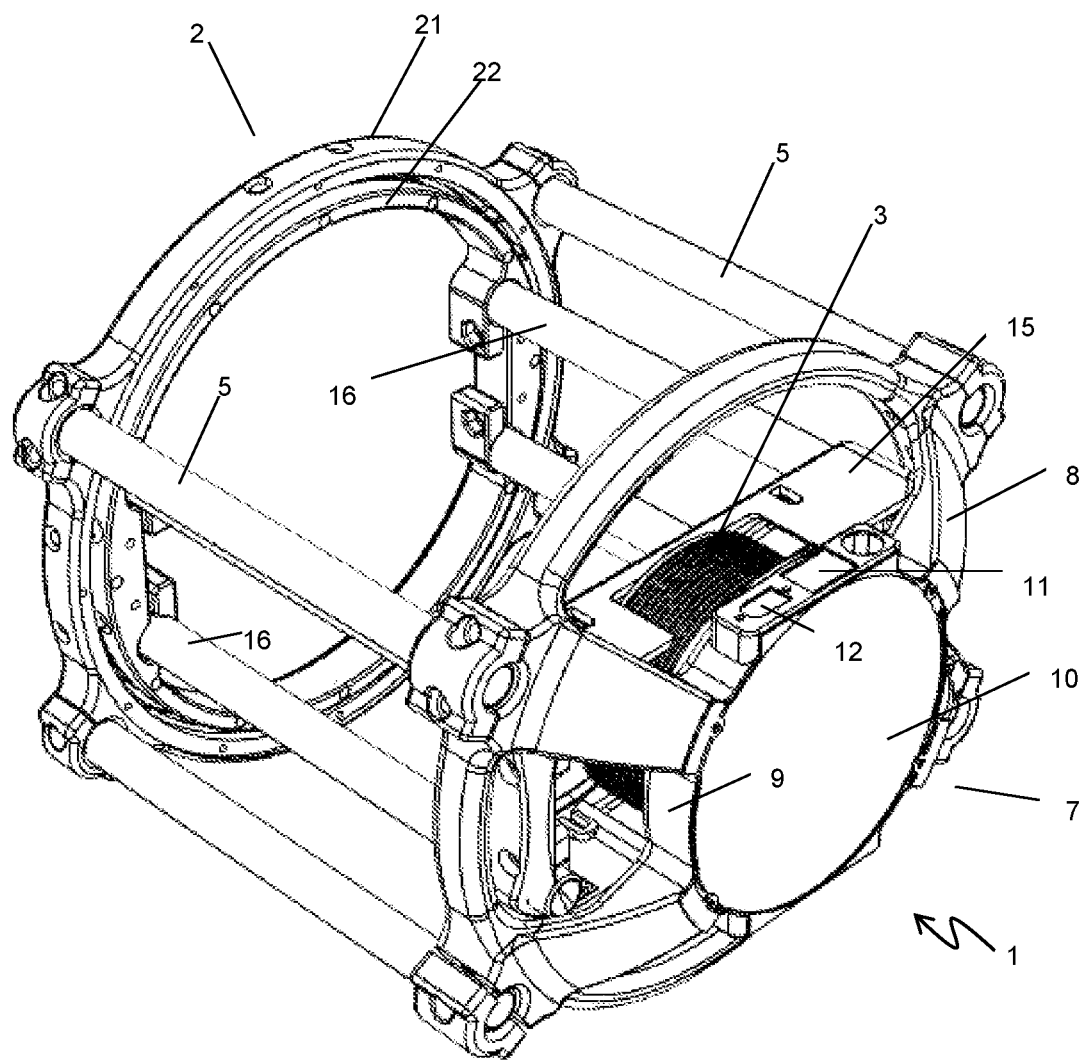
FIG. 1 is a perspective back view of a camera cage according to various embodiments.
Figure 2:
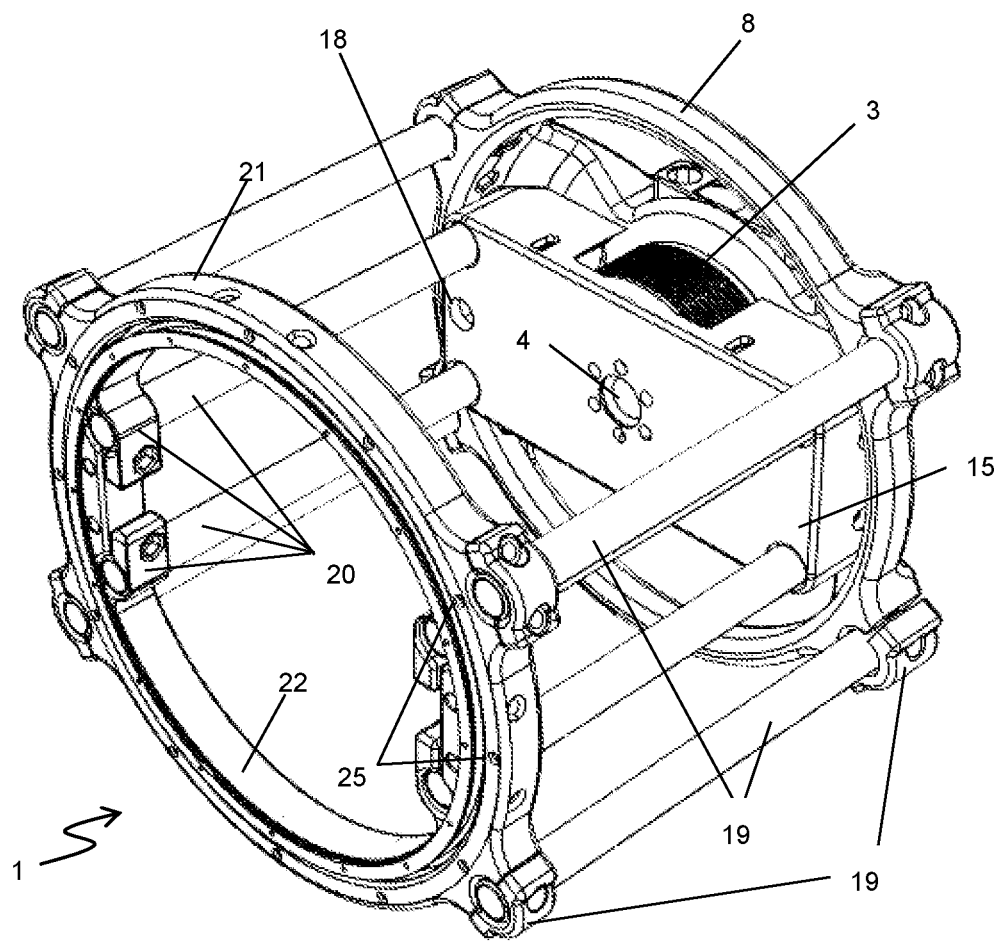
FIG. 2 is a perspective side view of a camera cage according to various embodiments.

In the camera cage 1 of FIGS. 1 and 2, the base frame 8 is a circular base frame with the same outer diameter as the ring bearing 2. By means of a first set of clamps and rods 19, the base frame 8 and the ring bearing 2 can be positioned at mutually variable distances around a common central axis, i.e. around the central axis of the ring bearing 2. As such, the depth (d) of the camera cage 1 can be adjusted to the camera to be suspended in the camera cage 1.

Centrally in the base frame 8, a motor 3 is mounted with its motor shaft 4 coaxially with the central axis of the ring bearing 2. The motor 3 is present within a motor holder 9, which in the present configuration comprises a motor holder lid 10 to allow easy access to the motor 3. Also visible to side of the motor holder 9 is the power supply connection 12 and the motor controller 11 for the balancing motor. In this configuration the motor holder 9 is part of the base frame 8, but evidently and as for example is visible from FIG. 3, the motor holder 9 could be replaceable and is suspended in the base frame 8. As mentioned herein before, this adds to the flexibility and ease of use of the camera cage 1 according to this disclosure.

Figure 3:
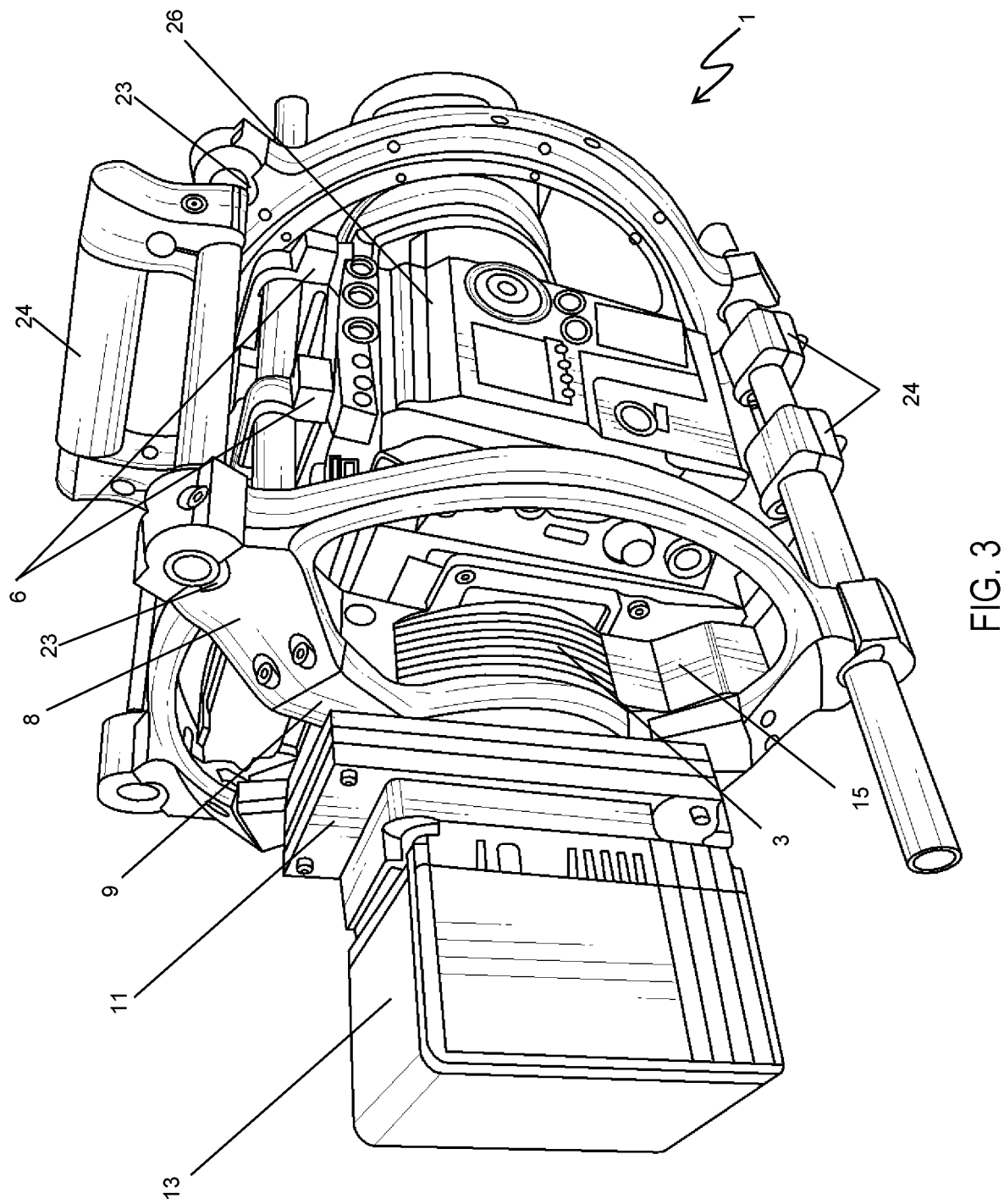
FIG. 3 is a perspective rear side view of a camera cage according to various embodiments.

Alternatively, to the motor holder 9 comprising both the motor 3 and the motor controller 11 as shown in FIG. 1, the motor controller 11 could be mounted onto the motor holder 9 as shown in FIG. 3. In particular, in combination with the removable and replaceable motor holder 9 as provided in this example, the camera cage 1 can be fully personalized and tailored to the needs of the camera that needs to be suspended in the camera cage 1. With a battery pack 13 for one or more batteries immediately accessible and replaceable mounted to the camera cage 1, ease of use is a further benefit of the camera cage 1 according to this disclosure.

FIG. 3 shows a further advantage of the camera cage 1 according to this disclosure. Being configured closely around the camera housing, the camera cage 1 is compact, lightweight, and easy to handle. The circular base frame 8, for example, can function as handles to hold the camera cage 1 in a frontal position. Further, additional elements 24, such as further handles, cross-bars, tripod, or camera crane mounting planes and the like, including oculars, for example, can be mounted to the frame elements of the camera cage 1, i.e. the base frame 8, the ring bearing 2, and the means 16 for connecting the base frame 8 and the ring bearing 2 about the same central axis at a mutually variable distance, more in particular the first set of rods and clamps 19 connecting the base frame 8 with the outer ring 21 of the ring bearing 2. The camera cage 1 is provided with a camera mount 6 such that the optical axis of the camera 26 is coaxial with the central axis of the ring bearing 2.

Figure 4:
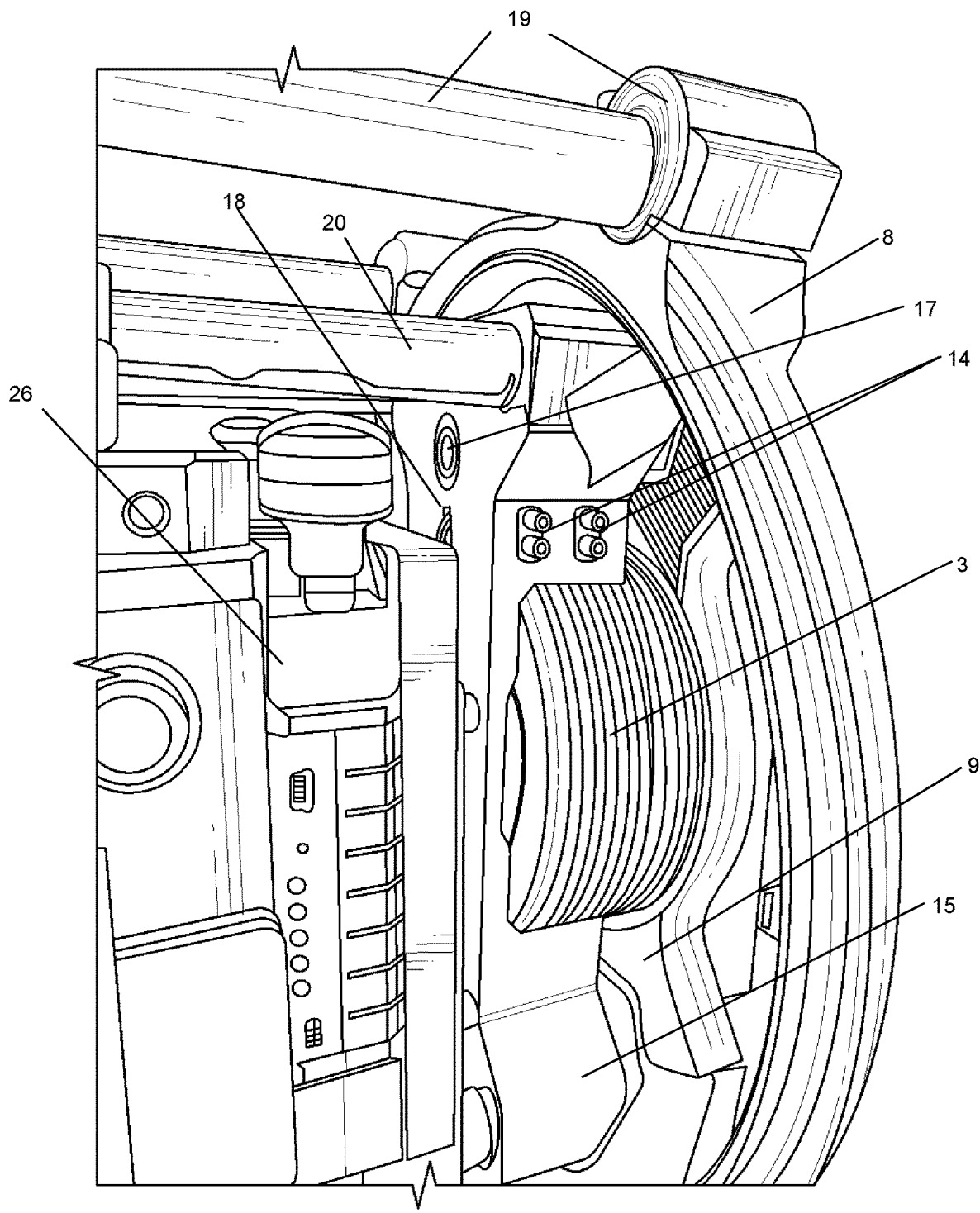
FIG. 4 is a detailed view of a rotatable base inside a camera cage according to various embodiments.
Figure 5:
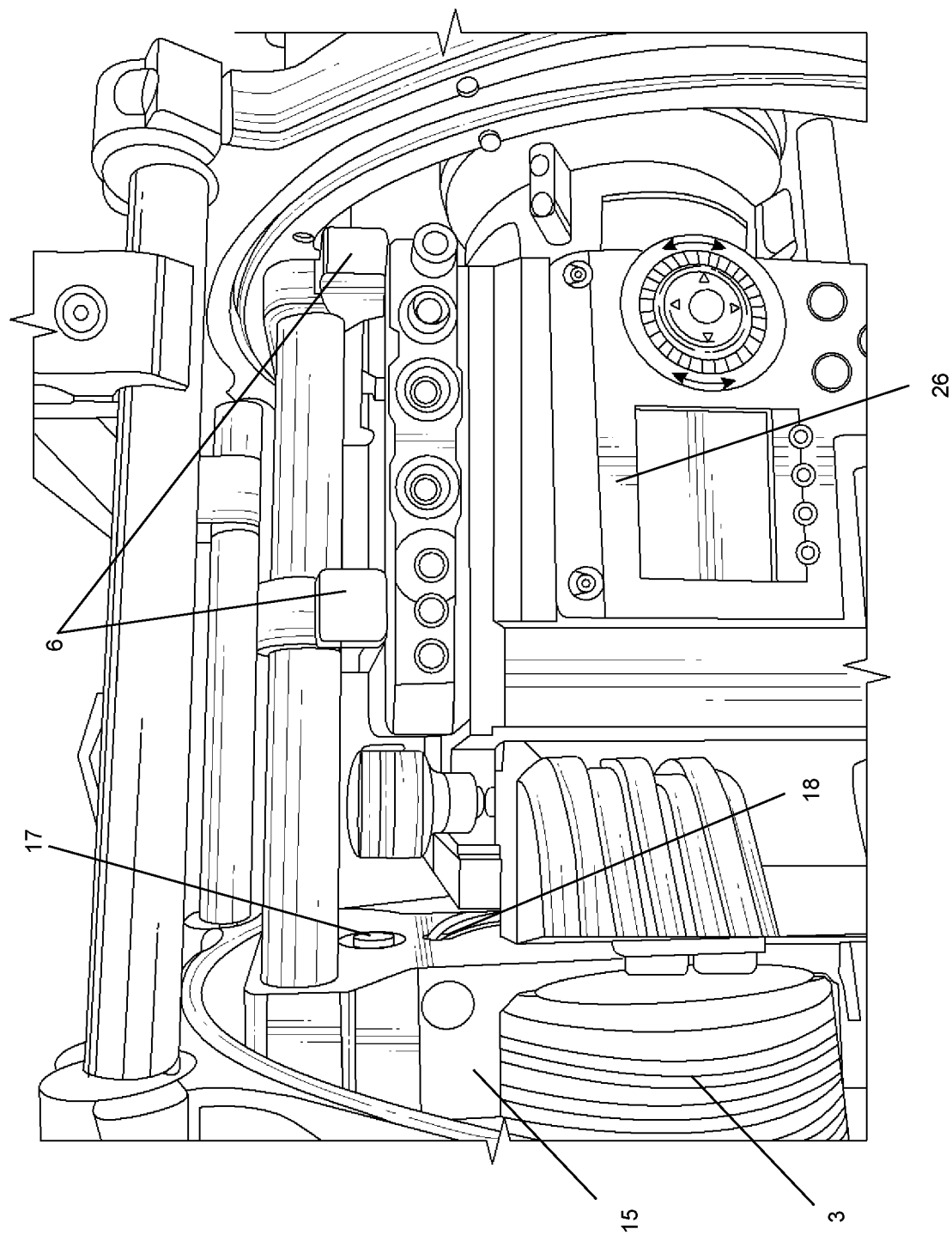
FIG. 5 is a detailed side view of a camera suspended inside a camera cage according to various embodiments.

Inside the camera cage 1 a rotatable base 15 is connected to the rotary motor shaft 4 of the motor 3 and connected through a second set of clamps and rods 20 with the inner ring 22 of the ring bearing 2. As for the first set of rods and clamps 19, also with this second set of rods and clamps 20, the mutual distance between the rotatable base 15 and the ring bearing 2 is adjustable at variable distances. Also visible in FIG. 2 and in more detail in FIG. 4, are the rotatable base connections 17 and rotatable base pass-throughs 18. As mentioned above, the rotatable base connections 17 and rotatable base pass-throughs 18 enable wiring of the camera, without affecting full 360-degree roll motion of the camera. Also visible in FIG. 2 are the different markers or reference points 25 at the outside of the ring bearing 2. From FIGS. 4 and 5 it can be derived that in the shown embodiment the camera 26 is not directly mounted to the rotatable base 15; instead, the camera 26 is suspended to the second set of clamps and rods 20 connecting the rotatable base 15 with the inner ring 22 of the ring bearing 2. For lightweight cameras with compact camera housings, the camera 26 can be mounted directly onto the rotatable base 15, for such cameras the connection between the rotatable base 15 in the inner ring 22 of the ring bearing 2 is optional.

To allow full 360-degree roll motion of the camera 26 around the central axis of the ring bearing 2, the camera cage 1 must be configured to enable said roll motion of the camera inside the camera cage 1. In the camera cage 1 according to this disclosure, this is easily realized through an appropriate selection of the dimensions of the base frame 8 and even adjustable through the means 5 for connecting the base frame 8 and/or the motor 3 with the ring bearing 2 at mutual variable distances. For example and per reference to FIG. 5, through inclusion of spacers 23 in the first set of clamps and rods 19, the outer perimeter of the camera cage 1 can be adjusted to allow such full 360-degree roll motion of the camera 26 inside the camera cage 1. In this shown embodiment the camera housing does not allow the double pair of second clamps and rods 20 as shown in FIGS. 1 and 2, and as such further demonstrates the flexibility of the camera housing in being adjustable to the camera that needs to be suspended in the camera cage 1, without loss of structural integrity and functionality.

It will be apparent to those skilled in the art that various modifications and variations can be made in the disclosed embodiments of the disclosed device without departing from the spirit or scope of the disclosure. Thus, it is intended that the present disclosure covers the modifications and variations of the embodiments disclosed above provided that the modifications and variations come within the scope of any claims and their equivalents provided hereinafter.

REFERENCE LIST

1. Camera cage
2. Ring bearing
3. Motor
4. Motor shaft or Rotary motor shaft

5. Means for connecting the motor and the ring bearing about the same central axis at a mutually variable distance
6. Camera mount
7. Base of the camera cage
8. Base Frame
9. Holder or Motor Holder
10. Motor holder lid
11. Motor Control Board or Motor Controller
12. A Power Supply Connection
13. A Battery Pack
14. Slip-ring connections
15. Rotatable Base
16. Means for connecting the rotatable base and the ring bearing at a mutually variable distance
17. Rotatable Base Connections
18. Rotatable Base Pass-Throughs
19. A First Set of Clamps and Rods
20. A Second Set of Clamps and Rods
21. Outer Ring of the Ring Bearing
22. Inner Ring of the Ring Bearing
23. Spacers
24. Additional Elements
25. Markers or Reference points
26. Camera

What is claimed is:

1. A camera cage for a camera, the camera cage comprising:
a ring bearing and a motor having a motor axis that is coaxial with a central axis of the ring bearing, the camera cage comprising:
means for keeping the motor and the ring bearing about a same central axis; and
means configured to adjust a distance between the motor and the ring bearing,
wherein:
the ring bearing has an inner diameter that may include a lens; and
the camera cage includes a camera mount such that the optical axis of the camera is coaxial with the central axis of the ring bearing.

2. The camera cage of claim 1, wherein the motor is suspended centrally in a base frame of the camera cage by a motor holder.

3. The camera cage of claim 2, wherein the base frame is circular.

4. The camera cage of claim 3, wherein the outer diameter of the base frame is equal to the outer diameter of the ring bearing.

5. The camera cage of claim 3, wherein the base frame and the ring bearing are connectable by at least two opposed rods at a mutually variable distance.

6. The camera cage of claim 5, wherein a first rod of the at least two opposed rods is connected to an outer ring of the ring bearing, and wherein a second rod of the at least two opposed rods is connected to an inner ring of the ring bearing.

7. The camera cage of claim 1, wherein a rotating portion of the motor inside the camera cage comprises a rotatable base that includes means for connecting the rotatable base to the ring bearing, the means for connection being configured to adjust a distance between the rotatable base and the ring bearing.

8. The camera cage of claim 7, wherein the camera mounts directly to the rotatable base or indirectly to the rotatable base by the means for connecting the rotatable base to the ring bearing at a mutually variable distance.

9. The camera cage of claim 7, wherein the rotatable base is provided with connections and/or pass-throughs.

10. The camera cage of claim 7, wherein the means for connecting the rotatable base to the ring bearing at a mutually variable distance from the motor and the rotatable base comprises combinations of clamps and rods.

11. The camera cage of claim 7, wherein the rotatable base is connected to an inner ring of the ring bearing by the means for being connected to the ring bearing at a mutually variable distance.

12. The camera cage of claim 1, wherein the camera cage has an outer perimeter that includes a camera housing for the camera.

13. The camera cage of claim 1, wherein the motor is interchangeable.

14. The camera cage of claim 1, wherein the camera cage further comprises a motor controller.

15. The camera cage of claim 14, wherein the motor controller is removable.

16. The camera cage of claim 14, wherein the motor controller is suspended from an outside of the base frame.

17. The camera cage of claim 16, wherein the motor controller is provided with a power supply connection.

18. The camera cage of claim 17, wherein the power supply connection comprises a battery.

19. The camera cage of claim 16, wherein the motor controller is interchangeable.

20. The camera cage of claim 1, wherein the ring bearing includes one or more camera center points.

* * * * *